(12) United States Patent
Richard et al.

(10) Patent No.: US 6,886,048 B2
(45) Date of Patent: Apr. 26, 2005

(54) TECHNIQUES FOR PROCESSING OUT-OF-ORDER REQUESTS IN A PROCESSOR-BASED SYSTEM

(75) Inventors: Elizabeth A. Richard, Houston, TX (US); John E. Larson, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 430 days.

(21) Appl. No.: 10/002,809

(22) Filed: Nov. 15, 2001

(65) Prior Publication Data

US 2003/0093630 A1 May 15, 2003

(51) Int. Cl.$^7$ .............................................. G06F 13/14
(52) U.S. Cl. .............................. 710/5; 710/52; 710/54; 710/55; 710/310; 711/109; 711/154; 711/159
(58) Field of Search ............................... 710/5, 52, 54, 710/55, 310; 711/109, 154, 159

(56) References Cited

U.S. PATENT DOCUMENTS

| 4,682,284 | A | * | 7/1987 | Schrofer ...................... 710/55 |
| 5,170,483 | A | * | 12/1992 | Keryvel et al. ................ 710/52 |
| 5,313,626 | A | | 5/1994 | Jones et al. .................. 395/575 |
| 5,331,646 | A | | 7/1994 | Krueger et al. ............. 371/40.1 |
| 5,367,669 | A | | 11/1994 | Holland et al. ............. 395/575 |
| 5,671,446 | A | * | 9/1997 | Rakity et al. ................. 710/54 |
| 6,098,132 | A | | 8/2000 | Olarig et al. ............... 710/103 |
| 6,223,301 | B1 | | 4/2001 | Santeler et al. ................ 714/6 |
| 6,356,972 | B1 | * | 3/2002 | Chin et al. .................. 710/310 |
| 6,629,218 | B1 | * | 9/2003 | Cho .......................... 711/154 |
| 6,633,575 | B1 | * | 10/2003 | Koodli ....................... 370/412 |
| 6,643,718 | B1 | * | 11/2003 | Chen et al. ................... 710/55 |
| 2002/0133658 | A1 | * | 9/2002 | Quan et al. ................. 710/243 |

FOREIGN PATENT DOCUMENTS

JP 361131043 A * 6/1986 .............. G06F/9/46

* cited by examiner

Primary Examiner—Rehana Perveen

(57) ABSTRACT

A mechanism for executing requests in a system. More specifically, a technique for processing requests to a memory system is provided. A shift register may be used to store an index associated with requests, such as read and write requests, to a memory system. Each request is stored in a respective queue depending on the source of the request and the request type (e.g. read or write). Each request includes flags which may be set to determine the processing order of the requests, such that out-of-order processing is feasible. An index corresponding to each of the requests is stored in an index shifter to facilitate the out-of-order processing of the requests. Alternatively, a shift register may be used to store each of the requests. Rather than shifting the indices to facilitate the out-of-order processing of requests, depending on the state of the corresponding request flags, the entire entry may be shifted.

45 Claims, 7 Drawing Sheets

TECHNIQUES FOR PROCESSING OUT-OF-ORDER REQUESTS IN A PROCESSOR-BASED SYSTEM

BACKGROUND OF THE INVENTION

1. Field of the Invention

This invention relates generally to memory systems and, more particularly, to processing requests in a memory system.

2. Background of the Related Art

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Computers today, such as personal computers and servers, rely on microprocessors, associated chip sets, and memory chips to perform most of their processing functions. Because these devices are integrated circuits formed on semiconducting substrates, the technological improvements of these devices have essentially kept pace with one another over the years. In contrast to the dramatic improvements of the processing portions of a computer system, the mass storage portion of a computer system has experienced only modest growth in speed and reliability. As a result, computer systems failed to capitalize fully on the increased speed of the improving processing systems due to the dramatically inferior capabilities of the mass data storage devices coupled to the systems.

While the speed of these mass storage devices, such as magnetic disk drives, has logged in recent years, the size of such disk drives has become smaller while maintaining the same or greater storage capacity. Furthermore, such disk drives have become less expensive. To capitalize on these benefits, it was recognized that a high capacity data storage system could be realized by organizing multiple small disk drives into an array of drives. However, it was further recognized that large numbers of smaller disk drives dramatically increased the chance of a disk drive failure which, in turn, increases the risk of data loss. Accordingly, this problem has been addressed by including redundancy in the disk drive arrays so that data lost on any failed disk drive can be reconstructed through the redundant information stored on the other disk drives. This technology has been commonly referred to as "redundant arrays of inexpensive disks" (RAID).

To date, at least five different levels of RAID have been introduced. The first RAID level utilized mirrored devices. In other words, data was written identically to at least two disks. Thus, if one disk failed, the data could be retrieved from one of the other disks. Of course, a level 1 RAID system requires the cost of an additional disk without increasing overall memory capacity in exchange for decreased likelihood of data loss. The second level of RAID introduced an error code correction (ECC) scheme where additional check disks were provided to detect single errors, identify the failed disk, and correct the disk with the error. The third level RAID system utilizes disk drives that can detect their own errors, thus eliminating the many check disks of level 2 RAID. The fourth level of RAID provides for independent READs and WRITEs to each disk which allows parallel input-output operations. Finally, a level 5 RAID system provides memory striping where data and parity information are distributed in some form throughout the disk drives in the array.

The implementation of data redundancy, such as in the RAID schemes discussed above, creates fault tolerant computer systems where the system may still operate without data loss even if one drive fails. This is contrasted to a disk drive array in a non-fault tolerant system where the entire system is considered to have failed if any one of the drives fail. Of course, it should be appreciated that each RAID scheme necessarily trades some overall storage capacity and additional expense in favor of fault tolerant capability. Thus, RAID systems are primarily found in computers performing relatively critical functions where failures are not easily tolerated. Such functions may include, for example, a network server, a web server, a communication server, etc.

One of the primary advantages of a fault tolerant mass data storage system is that it permits the system to operate even in the presence of errors that would otherwise cause the system to malfunction. As discussed previously, this is particularly important in critical systems where downtime may cause relatively major economic repercussions. However, it should be understood that a RAID system merely permits the computer system to function even though one of the drives is malfunctioning. It does not necessarily permit the computer system to be repaired or upgraded without powering down the system. To address this problem, various schemes have been developed, some related to RAID and some not, which facilitate the removal and/or installation of computer components, such as a faulty disk drive, without powering down the computer system. Such schemes are typically referred to as "hot plug" schemes since the devices may be unplugged from and/or plugged into the system while it is "hot" or operating.

Although hot plug schemes have been developed for many computer components, including microprocessors, memory chips, and disk drives, most such schemes do not permit the removal and replacement of a faulty device without downgrading system performance to some extent. Furthermore, because memory chips have been traditionally more reliable than disk drives, error detection and correction schemes for memory chips have generally lagged behind the schemes used for disk drives.

However, certain factors may suggest that the reliability of semiconductor memory systems may also require improvement. For instance, in the near future, it is believed that it will be desirable for approximately 50% of business applications to run continuously 24 hours a day, 365 days a years. Furthermore, in 1998, it was reported that the average cost of a minute of downtime for a mission-critical application was $10,000.00. In addition to the increasing criticality of such computer systems and the high cost of downtime of such systems, the amount of semiconductor memory capacity of such systems has been increasing steadily and is expected to continue to increase. Although semiconductor memories are less likely to fail than disk drives, semiconductor memories also suffer from a variety of memory errors. Specifically, "soft" errors account for the vast majority of memory errors in a semiconductor memory. Such soft errors include cosmic rays and transient events, for instance, that tend to alter the data stored in the memory. Most soft errors are single bit errors that are correctable using standard ECC technology. However, some percentage of these errors are multi-bit errors that are uncorrectable by current ECC technology. Furthermore, the occurrence of soft errors increases linearly with memory capacity. Therefore, as memory capacities continue to increase, the number of soft errors will similarly increase, thus leading to an increased likelihood that the system will fail due to a soft error. Semiconductor memories may also suffer from "hard" errors. Such hard errors may be caused by over voltage conditions which destroy a portion of the memory structure, bad solder joints, malfunctioning sense amplifiers, etc. While semiconductor memories are typically subjected to rigorous performance and burn-in testing prior to shipment, a certain percentage of these memories will still malfunction after being integrated into a computer system. Again, as the number of memory chips and the memory capacities of computer systems increase, a likelihood of a semiconductor memory developing a hard error also increases.

Many systems include multiple processing units or microprocessors connected via a processor bus. To coordinate the exchange of information among the processors, a host controller is generally provided. The host controller is further tasked with coordinating the exchange of information between the plurality of processors in the memory system. The host controller may be responsible for the exchange of information in the typical Read-Only Memory (ROM) and the Random Access Memory (RAM), as well as the cache memory in high speed systems. Cache memory is a special high speed storage mechanism which may be provided as a reserved section of the main memory or as an independent high-speed storage device. Usually, the cache memory is a portion of the RAM which is made of high-speed Static RAM (SRAM) rather than the slower and cheaper Dynamic RAM (DRAM) which may be used for the remainder of the main memory. Alternatively or additionally, cache memory may be located in each processor. By storing frequently accessed data and instructions in the cache memory, the system can minimize its access to the slower main memory and thereby increase the request processing speed of the system.

The host controller may be responsible for coordinating the exchange of information among a plurality of system buses as well. For example, the host controller may be responsible for coordinating the exchange of information from input/output (I/O) devices via an I/O bus. Further, systems often implement split processor buses wherein the host controller is tasked with exchanging information between the plurality of processor buses and the memory system. With increased processor and memory speeds becoming more essential in today's fast-paced computing environment, it is advantageous to facilitate the exchange of information in the host controller as quickly as possible. Due to the complexities of the ever-expanding system architectures, which are being introduced in today's computer systems, the task of coordinating the exchange of information becomes increasingly difficult.

In complex systems, which include multiple processors and multiple buses, the host controller generally implements a complex queuing structure to maintain proper ordering of requests being initiated to and from various components in the system. Disadvantageously, to facilitate processing through the complex queuing structure, additional considerations may be necessary to maintain proper priority levels and provide a mechanism for out-of-order processing of requests to minimize system latency. Traditional systems may sacrifice cycle time to simplify the processing of requests.

The present invention may be directed to one or more of the problems set forth above.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
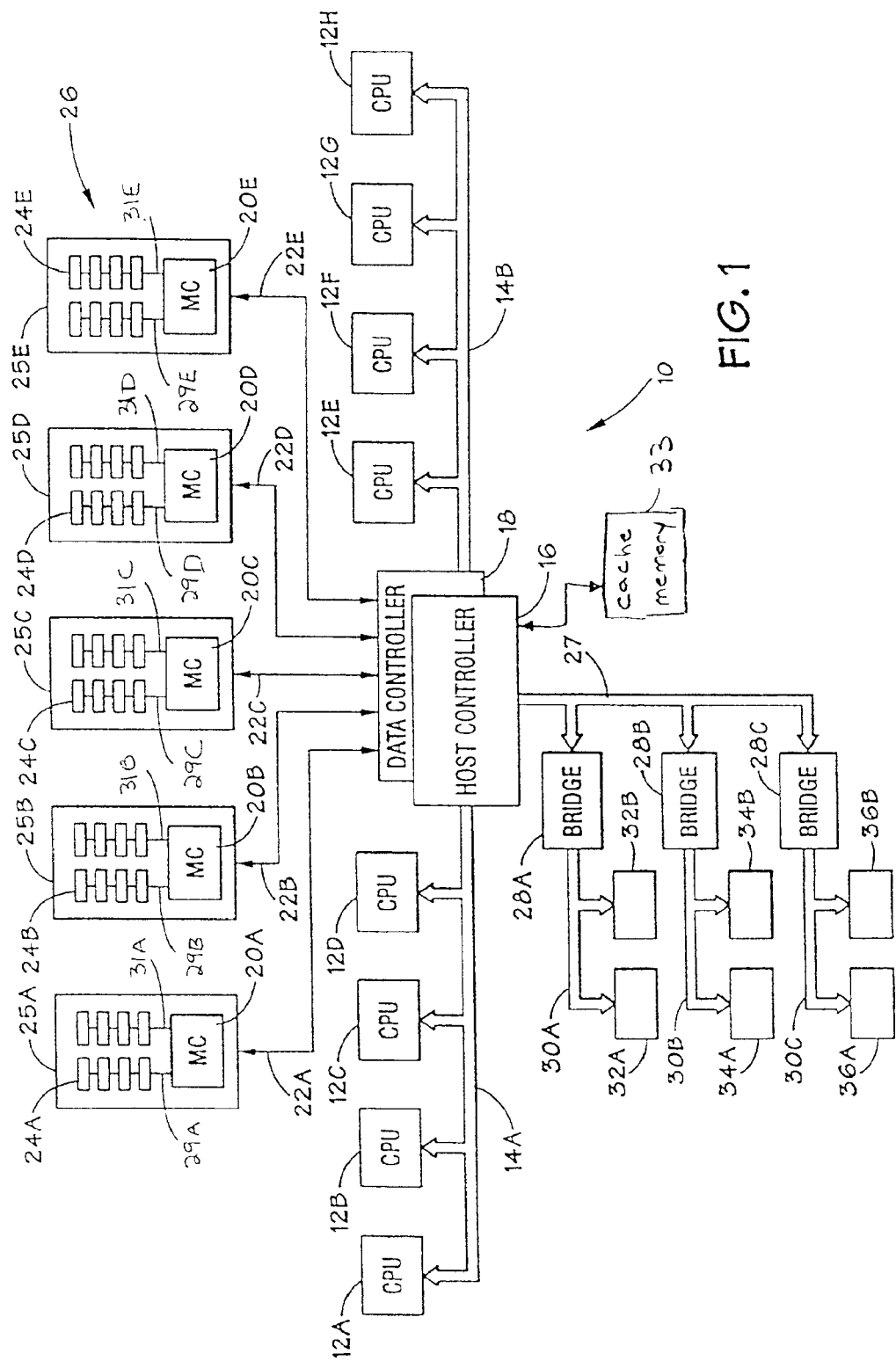
FIG. 1 is a block diagram illustrating an exemplary computer system having a multiple processor bus architecture.

Turning now to the drawings and referring initially to FIG. 1, a block diagram of an exemplary computer system with multiple processor buses and an I/O bus, generally designated as reference numeral 10, is illustrated. The computer system 10 typically includes one or more processors or CPUs. In the exemplary embodiment, the system 10 utilizes eight CPUs 12A–12H. The system 10 utilizes a split-bus configuration in which the CPUs 12A–12D are coupled to a first bus 14A and the CPUs 12E–12H are coupled to a second bus 14B. It should be understood that the processors or CPUs 12A–12H may be of any suitable type, such as a microprocessor available from Intel, AMD, or Motorola, for example. Furthermore, any suitable bus configuration may be coupled to the CPUs 12A–12H, such as a single bus, a split-bus (as illustrated), or individual buses. By way of example, the exemplary system 10 may utilize Intel Pentium III processors and the buses 14A and 14B may operate at 100/133 MHz.

Each of the buses 14A and 14B is coupled to a chip set which includes a host controller 16 and a data controller 18. In this embodiment, the data controller 18 is effectively a data cross-bar slave device controlled by the host controller 16. The data controller 18 may be used to store data from one area of the system 10 awaiting transfer to a requesting area of the system 10 and to implement data manipulation and checking operations. Because of the master/slave relationship between the host controller 16 and the data controller 18, the chips may be referred to together as the host/data controller 16, 18. The host/data controller 16, 18 is further coupled to main memory 24 via one or more memory controllers. In this particular example, the host/data controller 16, 18 is coupled to five memory controllers 20A–20E via five individual bus segments 22A–22E, respectively. The individual bus segments 22A–22E may be referred to collectively as the "MNET" or "MNET bus." Each of the memory controllers 20A–20E is further coupled to a segment of main memory designated as 24A–24E, respectively. As discussed in detail below, each of the memory segments 24A–24E is typically comprised of dual inline memory modules (DIMMs). Further, each memory segment 24A–24E and respective memory controller 20A–20E may comprise a single memory cartridge 25A–25E which may be removable. In the present configuration, data may be stored in a "4+1" parity striping pattern wherein one of the memory cartridges 25A–25E is used to provide redundancy for the collective memory system 26. The 4+1 parity striping in conjunction with the ability to power down individual memory cartridges 25A–25E through each respective memory controller 20A–20E and associated bus segment 22A–22E facilitates hot plug capabilities for the memory cartridges 25A–25E. Further, the system 10 also includes an area of cache memory, functionally illustrated as cache memory 33. However, as previously described, the cache memory 33 may be located in each CPU 12A–12H.

The memory segments may be organized on a single channel or on 2N channels, where N is an integer. In this particular embodiment, each of the memory segments 24A–24E is divided into two channels—a first channel 29A–29E and a second channel 31A–31E, respectively. Since each memory segment 24A–24E in this embodiment is capable of containing up to eight DIMMs, each channel is adapted to access up to four of the eight DIMMs. Because this embodiment includes two channels, each of the memory controllers 20A–20E may include two independent memory controllers.

As will be appreciated from the discussion herein, the number of memory segments 24 may vary depending upon the type of memory system desired. In general, redundant memory systems will utilize two or more memory segments 24. Although the five memory segments 24A–24E illustrated in the exemplary embodiment facilitates a "4+1" striping pattern of data and parity information as discussed in detail below, a memory system having two memory segments 24 may be used in which data is mirrored on each segment to provide redundancy. Similarly, a memory system having three or more memory segments may be used to provide various combinations of data and parity striping.

Each of the memory controllers 20A–20E and its associated main memory segment 24A–24E forms a portion of the main memory array 26. The five memory controllers 20A–20E operate in lock-step. In this example, each of the memory controllers 20A–20E handle a separate quad-word of each cacheline of data (assuming a 42 byte cacheline) that is being transferred to or from the host and data controllers 16 and 18. For example, the memory controller 20A handles the first quad-word of every data READ and WRITE transaction, the memory controller 20B handles the second quad-word, the memory controller 20C handles the third quad-word, and the memory controller 20D handles the fourth quad-word. Instead of receiving one of the four quad-words, the memory controller 20E handles data parity for the four quad-words handled by the memory controllers 20A–20D. Thus, as described below, the memory array 26 forms a "redundant array of industry standard DIMMs" (RAID) memory structure.

During a data READ operation, the host/data controller 16, 18 receives four quad-words of data plus parity from the five memory controllers 20A–20E, validates data integrity of each quad-word and parity using ECC codes, and, if necessary, corrects bad data using an exclusive OR (XOR) engine before forwarding the data to its destination. During a data WRITE operation, the host/data controller 16,18 uses the XOR engine to calculate data parity and transfers the four quad-words of data and the quad-word of parity to the five respective memory controllers 20A–20E. In this embodiment, all data transfers between the host/data controller 16, 18 and the five memory controllers 20A–20E are an entire cacheline, and partial WRITEs are translated into read-modify-write operations.

Furthermore, the five memory bus segments 22A–22E (MNET bus) provide electrical isolation to each of the respective five memory controllers 20A–20E to facilitate hot-plug removal and/or replacement of each of the five memory segments 24A–24E. The RAID functionality described herein allows any one of the five memory segments 24A–24E to be removed while the system 10 continues to operate normally, albeit not in a redundant mode. Once the removed memory segment is reinstalled, the data is rebuilt from the other four memory segments, and the memory system resumes operation in its redundant, or fault-tolerant, mode.

In this embodiment, each of the memory segments 24A–24E may include one to eight dual inline memory modules (DIMMs). Typically, such DIMMs are organized in an X4 or an X8 fashion. In other words, the memory chips on the DIMM are either 4 bits wide or 8 bits wide. To produce a 72 bit quad-word using an X4 memory organization, an exemplary DIMM may include nine 4 bit wide memory chips located on one side of the DIMM and nine 4 bit wide memory chips located on the opposite side of the DIMM. Conversely, to produce a 72 bit quad-word using an X8 memory organization, an exemplary DIMM may include nine 8 bit wide memory chips located on a single side of the DIMM. The memory chips on each DIMM are typically selected from one or more DRAM technologies, such as synchronous DRAM, double data rate SDRAM, direct-RAM BUS, and synclink DRAM.

The host/data controller 16, 18 is typically coupled to one or more bridges 28A–28C via a suitable bus 27. The opposite side of each bridge 28A–28C is coupled to a respective bus 30A–30C, and a plurality of peripheral devices 42A and B, 44A and B, and 46A and B may be coupled to the respective buses 30A, 30B, and 30C. The bridges 28A–28C may be any of a variety of suitable types, such as PCI, PCI-X, EISA, AGP, etc.

Figure 2:
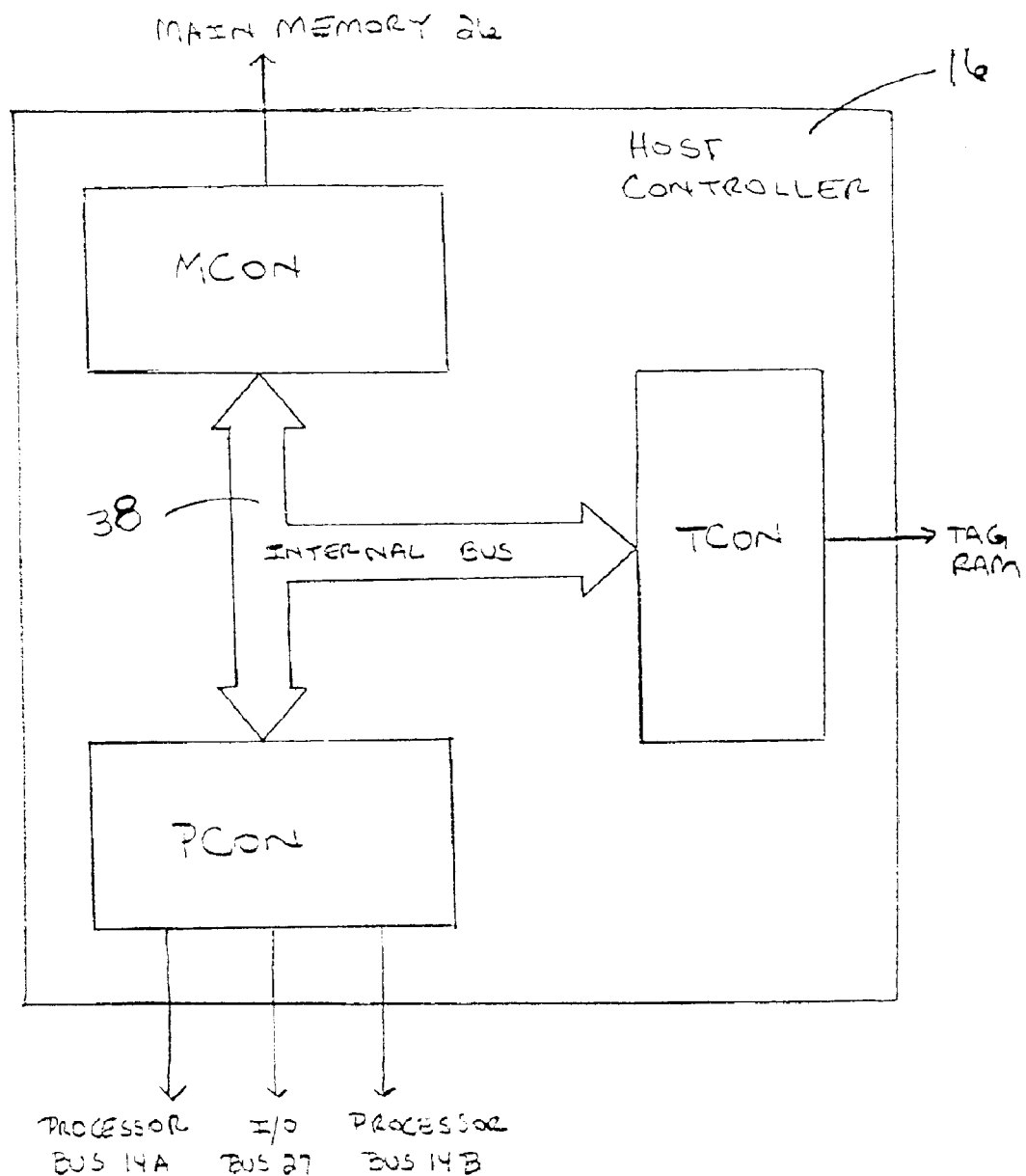
FIG. 2 is a block diagram illustrating an exemplary host controller of the system of FIG. 1 in accordance with the present techniques.

FIG. 2 illustrates a block diagram of the host controller 16. The host controller 16 generally coordinates the exchange of requests and data from the processor buses 14A and 14B, the I/O bus 27, and the memory 26 via various controllers within the host controller 16. The controllers are operably coupled to each other via an internal host bus 38 to facilitate the exchange of information and data within the host controller 16. The host controller 16 includes a master memory controller MCON that facilitates communication with the individual memory controllers 20A–20E in each memory module 25A–25E. The master memory controller MCON will be discussed more fully with reference to FIGS. 3–7.

The host controller 16 also includes a processor controller PCON for each of the processor and I/O buses 14A, 14B, and 27. For simplicity, the processor controller corresponding to the processor bus 14A may be designated as "PCON0." The processor controller corresponding to the processor bus 14B may be designated as "PCON1." The processor controller corresponding to the I/O bus 27 may be designated as "PCON2." Essentially, each processor controller PCON0–PCON2 serves the same function which is to connect a respective bus, which is external to the host controller 16 (i.e., processor bus 14A and 14B and I/O bus 27), to the internal blocks of the host controller 16. Thus, the processor controllers PCON0–PCON2 facilitate the interface from the host controller 16 to each of the buses 14A, 14B, and 27. In an alternate embodiment, a single processor controller PCON may serve as the interface for all of the system buses 14A, 14B, and 27. Further, additional processor controllers (e.g., PCON3 and PCON4) may be designated for a system comprising additional processor or I/O buses. Any number of specific designs for the processor controller PCON may be implemented in accordance with the bus configurations described herein, as can be appreciated by those skilled in the art.

The host controller 16 also includes a tag controller TCON. The tag controller TCON maintains coherency and request cycle ordering in the cache memory 33. "Cache coherence" refers to a protocol for managing the caches in a multiprocessor system, such as the system 10, so that no data is lost or over-written before the data is transferred from the cache memory 33 to a requesting or target device. Because frequently-accessed data may be stored in the cache memory 33, the agent requesting data stored in memory should be able to identify which area of the memory 26 (cache or non-cache) it should access to retrieve the required information as efficiently as possible. A "tag RAM" is an area that identifies which data from the main memory 26 is currently stored in each cache line. The values stored in the tag RAM determine whether the actual data can be retrieved quickly from the cache 33 or whether the requesting device should access the slower DRAM portion of the main memory 26. Thus, the tag controller TCON maintains coherency and controls access to the tag RAM. Any number of specific designs for a tag controller TCON for maintaining cache coherency may be implemented in accordance with the bus configurations described herein, as can be appreciated by those skilled in the art.

Figure 3:
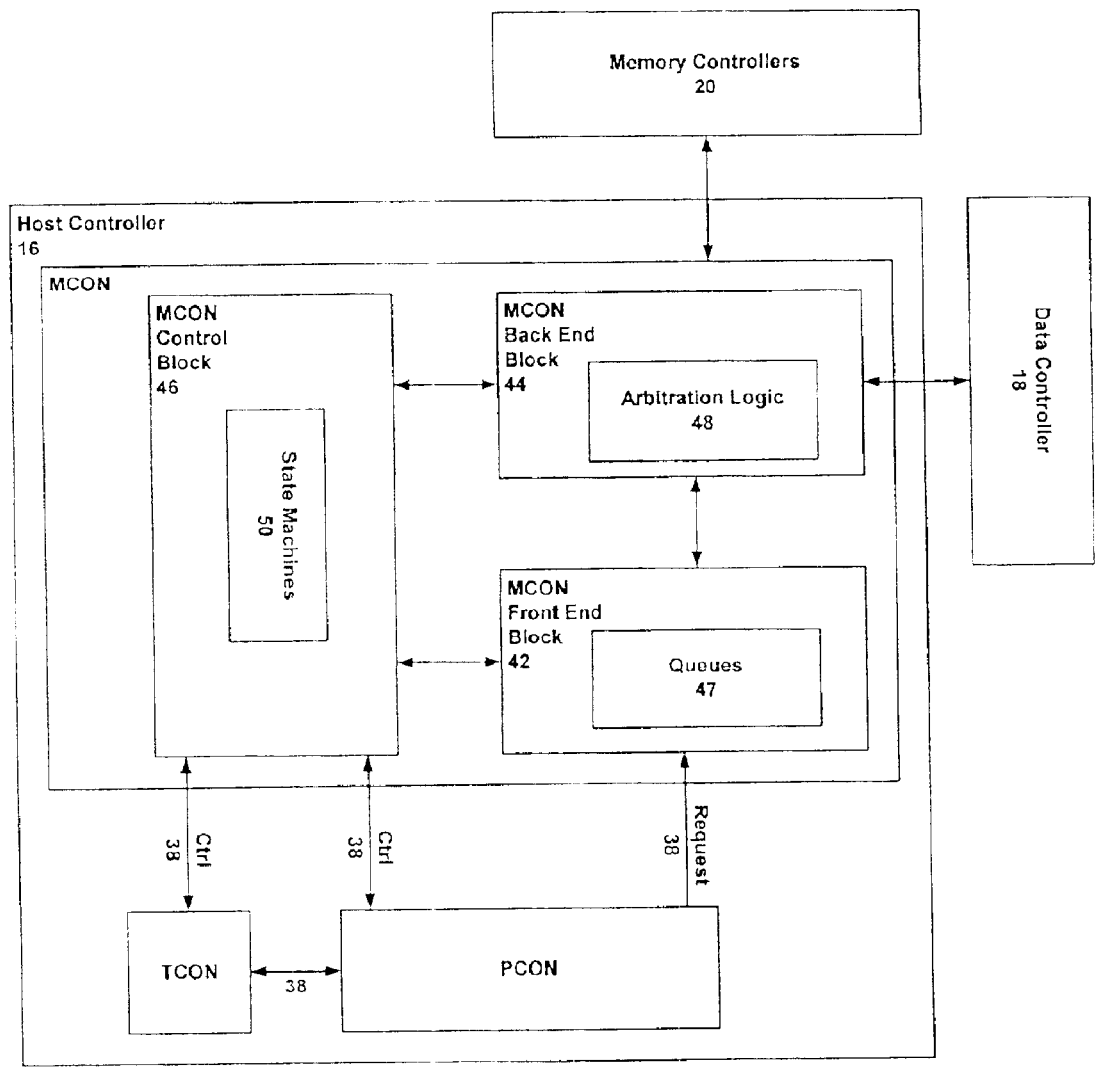
FIG. 3 is a block diagram illustrating an exemplary memory controller of the host controller of FIG. 2 in accordance with the present techniques.

Turning now to FIG. 3, a block diagram of the master memory controller MCON is illustrated. The master memory controller MCON generally provides an interface between the individual memory controllers 20A–20E in each memory cartridges 25A–25E and the other portions of the system 10. The master memory controller MCON generally includes a front end 42, a back end 44, and a control block 46. The MCON front end 42 is responsible for accepting transactions, such as READ and WRITE requests, from the processor controller PCON and storing the requests into various queues 47, which will be described more fully with reference to FIGS. 4 and 5. The MCON front end 42 is further responsible for handling tracking information about the queue entries and passing the requests to the MCON back end 44. The MCON back end 44 includes various arbitration logic 48 which facilitates the priority processing of each request such that the requests can be delivered to the memory controller 20 (i.e., individual memory controllers 20A–20E in each memory cartridge 25A–25E) in an acceptable order. The MCON control block 46 generally provides control signals to the MCON front end 42 and the MCON back end 44 to facilitate the storing of requests in the queues 47 and the processing of the requests through the arbitration logic 48. The MCON control block 46 typically includes one or more state machines 50 to facilitate the decision making and command generation to assert the control signals to the MCON front end 42 and the MCON back end 44.

Because high-cycle latency associated with the processing of requests generally reduces system efficiency, the queuing structures and associated processing mechanisms are generally configured to optimize the request processing speed. The front end 42 described herein processes the requests by implementing a complex queuing structure which allows for out-of-order execution of requests and handles multiple entries loading from the various buses 14A, 14B, and 27 in a single clock period. The master memory controller MCON also provides for the retention of proper priority levels for outstanding requests to maintain request ordering from the oldest to the newest requests. Further, by minimizing the number of system stalls associated with processing the requests, the cycle time is decreased and the system 10 is advantageously more efficient.

Figure 4:
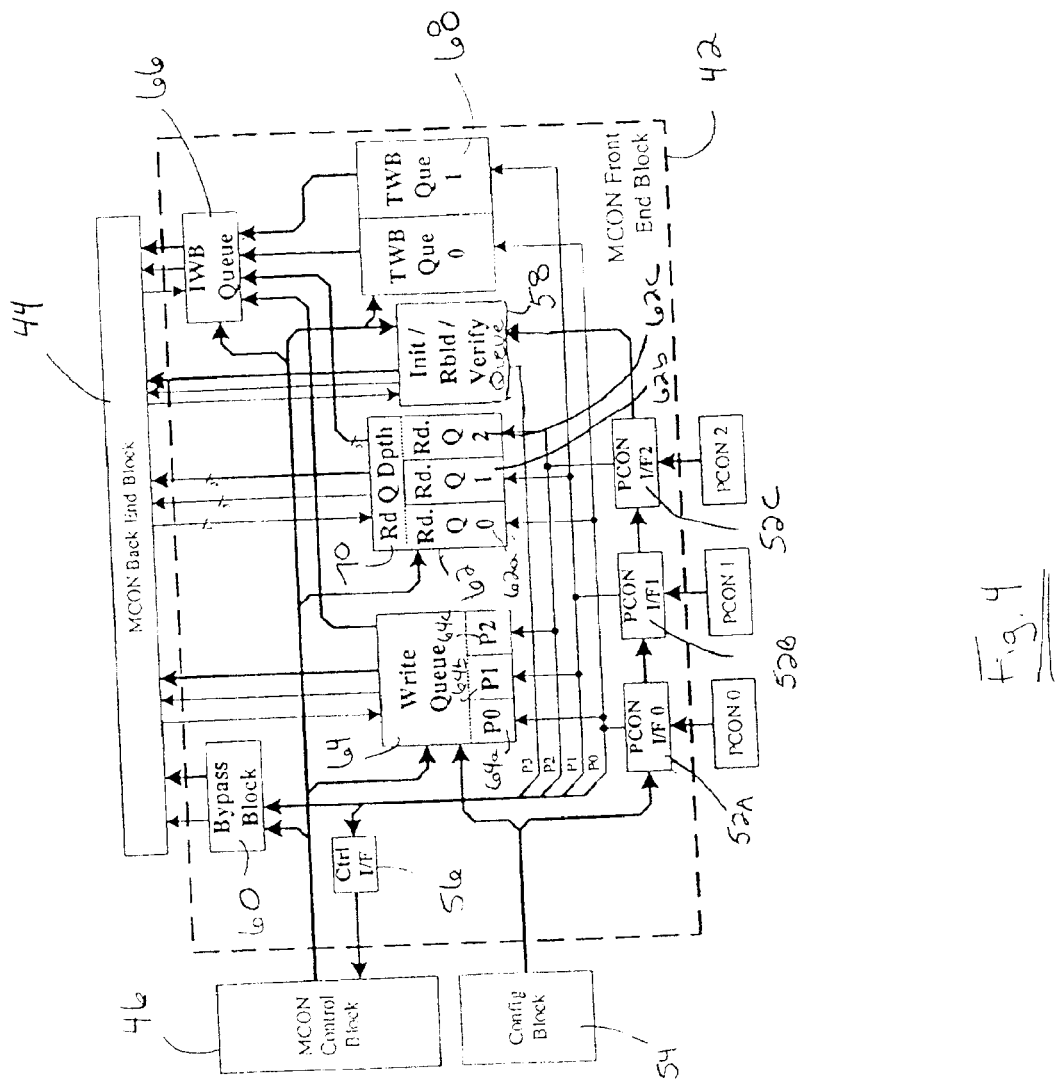
FIG. 4 is a block diagram illustrating an exemplary front end of the memory controller of FIG. 3 in accordance with the present techniques.

FIG. 4 illustrates a block diagram of the MCON front end 42. As previously discussed, the MCON front end 42 interfaces with the processor controllers PCON0–PCON2 corresponding to the processor and I/O buses 14A, 14B, and 27. The MCON front end 42 includes PCON interface blocks 52A–52C to facilitate the exchange of information with each corresponding processor controller PCON0–PCON2. Each PCON interface 52A–52C includes decoders to translate each system request and corresponding system address delivered from the processor controllers PCON0–PCON2 to the entry and corresponding memory address which will be stored in the appropriate queues. The configuration block 54 provides control signals to the PCON interfaces 52A–52C to provide control maps for the address decoding and to provide various other control signals involved in the decoding of the information received from the processor controllers PCON0–PCON2. Each PCON interface 52A–52C produces various output signals to indicate that certain transactions should take place. Queue select signals corresponding to the various queues in the MCON front end 42 are provided by the PCON interface 52A–52C to facilitate the storage of a particular request in a corresponding queue. Further, other signals, including information such as request type, address, memory mapped configuration address, transaction identification including source and cycle identification, and request size may also be provided as outputs by the PCON interface 52A–52C.

The control interface block 56 prepares incoming requests to be transferred to the MCON control block 46. Each request or transaction is registered and delivered to the MCON control block 46 upon assertion of a control block select signal in the request received from one of the PCON interfaces 52A–52C. The control interface block 56 delivers transactions from the PCON interfaces 52A–52C to the MCON control block 46, as well as transactions initiated from the RAM initialize, rebuild and verify (IRV) queue 58 which is implemented during a hot-plug operation. During a hot-plug operation, a memory segment 24A–24E may be replaced. Once the corresponding memory cartridge 25A–25E is re-inserted into the system 10, the memory segment 24A–24E is generally powered-up and initialized. After initializing the memory segment 24A–24E, the data that should be stored in the memory segment 24A–24E is rebuilt using the remaining memory segments 24A–24E. Once the data is re-written to the corresponding memory segment 24A–24E, the data is re-read or verified. The IRV queue 58 maintains a structured order during the initialize, rebuild, and verify operation of the associated requests implemented during a hot-plug procedure.

As will be discussed further herein, the various queues in the MCON front end 42 initiate various requests to pass data to the MCON back end 44 for processing. However, when no queues are initiating such requests, a bypass block 60 may be provided such that certain incoming transactions, such as READ transactions, may be forwarded directly to the MCON back end block 44 prior to being saved in the queues. Thus, if each of the request signals for each of the queues in the MCON front end 42 are de-asserted, a transaction, such as a READ request, may be passed directly to the MCON back end 44 through the bypass block 60. Conversely, if any of the queues contain unprocessed requests, the bypass block 60 may be de-asserted such that incoming requests are delivered to a respective queue for proper ordering before being delivered to the MCON back end 44.

As previously discussed, the MCON front end 42 comprises a plurality of queues such as an IRV queue 58, a READ queue 62, a WRITE queue 64, an Implicit WriteBack (IWB) queue 66, and a Tag-castout WriteBack (TWB) queue 68. Generally speaking each of the queues in the MCON front end 42 maintains an ordered list of a corresponding request type. Each of the queues will be described generally and then an exemplary embodiment of the READ queue 62 will be further described with reference to FIG. 5. Each of the techniques described herein will be described with reference to the READ queue 62. However, as can be appreciated by those skilled in the art, the techniques described herein with reference to FIGS. 5, 6, and 7 may be advantageously incorporated by the other system queues, such as the WRITE queue 64. Further, each of the queues 58, 62, 64, 66, and 68 may actually comprise a plurality of sub-queues to facilitate system designs which incorporate latency reducing techniques such as interleaving. For instance, in the present design configurations, it may be advantageous to include three READ sub-queues 62a–c, as illustrated in FIG. 4, such that each processor bus 14A and 14B and each I/O bus 27 has a respective READ sub-queue 62a–c to store READ requests initiated from a respective bus (14A, 14B, or 27). These respective queues are illustrated as READ queue 0, READ queue 1, and READ queue 2.

The READ queue 62 maintains an ordered list of the READ requests delivered from the processor controllers PCON0–PCON2. Generally, the READ queue 62 stores and tracks READ requests initiated from an agent on one of the processor buses 14A and 14B or the I/O bus 27 and directed to one of the memory controllers 20A–20E. The READ queue 62 may include a READ queue depth checker 70 to monitor the combined depth of the READ sub-queues 62a–c. The READ queue depth checker 70 monitors the READ sub-queues 62a–c to insure that the READ sub-queues 62a–c do not exceed some threshold number of entries. READ requests are optimized to request the memory system 26 immediately. Many of the READ requests eventually will be retried, however, and in these cases the data returned from the memory system 26 will be ignored. If the system is saturated with READ requests, this "head-start" on fetching READ data is turned off by requiring each transaction to wait for a Read Ready signal. This allows more access to the memory system 26 by those transactions which will not be retried. The READ queue 62 will be discussed further with reference to FIG. 5.

The WRITE queue 64 maintains an ordered list of the WRITE requests delivered from the processor controllers PCON0–PCON2. Generally, the WRITE queue 64 tracks the entries that are WRITE transactions which are bound for the memory controllers 20A–20E. The WRITE queue 64 may include a plurality of WRITE sub-queues 64a–c, each sub-queue corresponding to a unique processor controller PCON0–PCON2. Further, the WRITE queue 64 may include a WRITE arbiter (not shown) which determines which of the requests from the various WRITE sub-queues 64a–c will be sent to the MCON back end 44 for processing. The WRITE arbiter may for instance, receive a sub-queue depth indicator from each of WRITE the sub-queues 64a–c and prioritize a request from the WRITE sub-queue 64a–c containing the most requests. Further, the WRITE arbiter may perform a similar function to the READ queue depth counter 70 in that it may facilitate the flushing of any of the WRITE sub-queues 64a–c once they reach some predetermined threshold which may slow system performance.

The MCON front end 42 may include various other queues depending on the system configuration. For example, the present exemplary embodiment includes an IRV queue 58, an IWB queue 66 and a TWB queue 68. As previously explained, the IRV queue 58 generally includes requests associated with initializing, rebuilding, and verifying memory segments 24A–24E after a hot-plug procedure. When a transaction is received from a CPU 12A–12H, the address is hashed into a tag index by the tag controller TCON (FIG. 2). The cache state is stored in the cache memory 33 based on the tag index. If the incoming transaction's tag index collides with an existing valid tag entry in that cache memory 33, and that existing state is owned, then a Tag-castout WriteBack (TWB) transaction is generated to snoop the CPU 12A–12H which had the tag in the owned state. The requesting information for these TWB snoop transactions are stored in the MCON front end TWB queues 68. If the CPU 12A–12H had not modified the data, then the snoop response will indicate an unmodified hit. In this case, the request stored in the TWB queues 68 is discarded. If the CPU 12A–12H had modified the data, it will respond by writing this data back to the memory 26. In this case, the transaction is moved from the TWB queues 68 to the Implicit WriteBack (IWB) queues 66 in the MCON front end 42.

If a transaction is stored in the READ queues 62 and the tag controller TCON determines that the address is owned on another processor bus 14A or 14B, the tag controller TCON will snoop the CPUs 12A–12H on that bus 14A or 14B. If a CPU 12A–12H had modified the data at that address, it will write this data back to the memory 26. In this case, the READ transaction becomes a WRITE to the system memory 26. Consequently, the entry in the READ queues 62 for this transaction is transferred to the IWB queues 66. Similarly, a WRITE request to the system memory 26 may also be modified by another CPU 12A–12H. In this instance, the entry in the WRITE queues 64 for this transaction is copied to the IWB queues 66.

Figure 5:
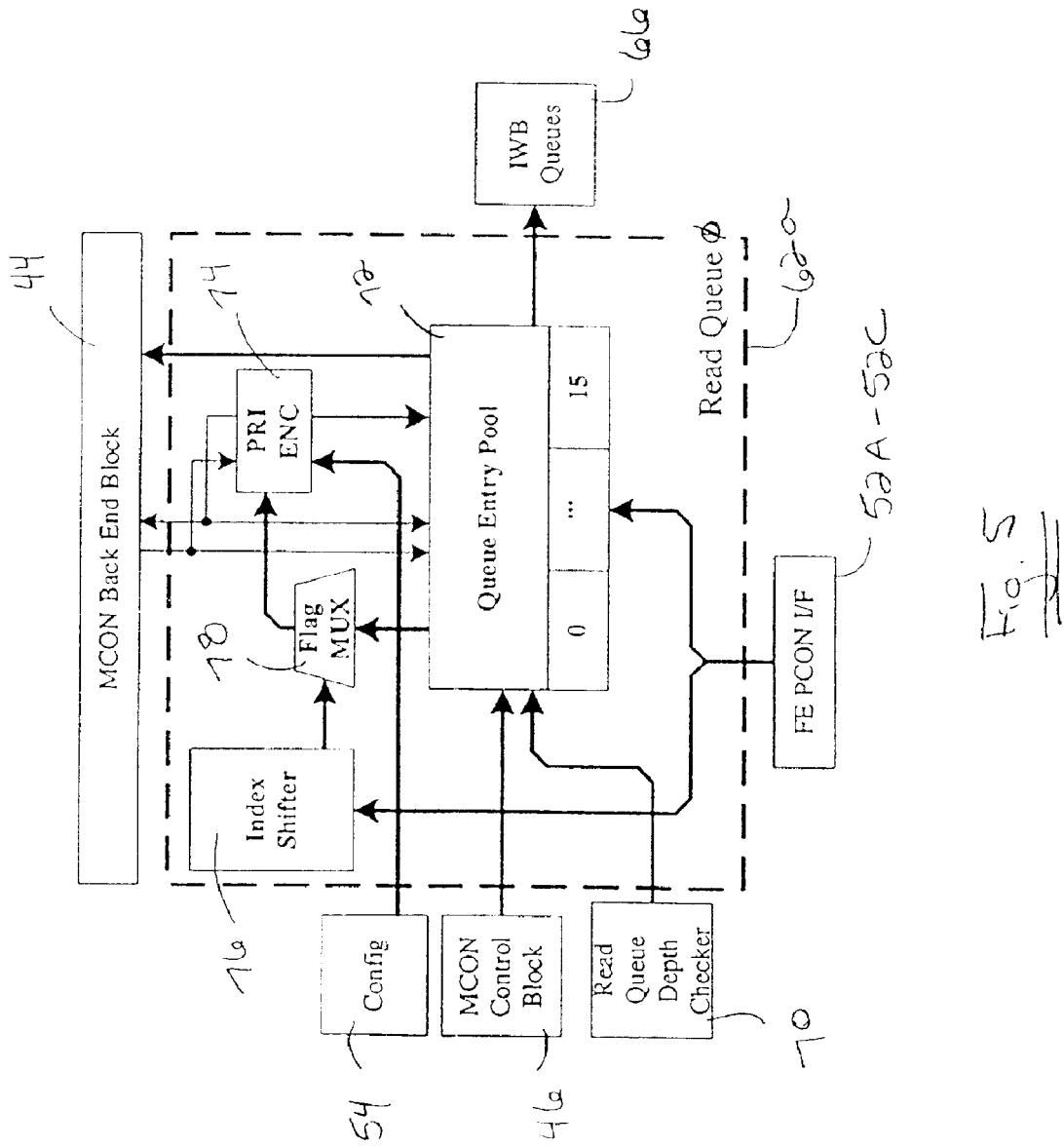
FIG. 5 illustrates a block diagram of an exemplary READ queue of the front end of FIG. 4 in accordance with the present techniques.

FIG. 5 illustrates an exemplary READ sub-queue, such as READ queue 0, generally designated by reference numeral 62a. As illustrated in FIG. 4, the READ sub-queue 62a receives input signals from the PCON interfaces 52A–52C, the MCON control block 46, the configuration block 54, the MCON back end 44, and the READ queue depth checker 70. Further, the READ sub-queue 62a produces output signals which are delivered to the MCON back end 44 and the IWB queue 66. When data is received from the PCON interfaces 52A–52C, it is stored in the queue entry pool 72. Each entry in the queue entry pool 72 is referenced by an index which is derived from an incoming transaction ID delivered from the PCON interfaces 52A–52C. The transaction ID is simply a unique identifier for a particular transaction. Thus, the index provides a unique identification for each request stored in the queue entry pool (QEP) 72, where each queue entry pool (QEP) index produces an address map into the QEP 72.

A variety of information corresponding to a request may be stored in a respective field in the queue entry pool 72 which may be referenced by the QEP index. Fields such as a valid entry field, entry ready field, entry sent field, entry pending field, and entry address may be stored in the QEP 72 for each request, for instance. However, as can be appreciated by those skilled in the art, other desirable information may be retained and stored in the QEP 72, as well.

In the present embodiment, the valid entry field is set when a request is written to the queue entry pool 72. Once an entry is written to the QEP 72, the MCON control block 46 sets the valid entry bit (i.e., stores a "1") for the corresponding request in the QEP 72. The valid entry bit indicates that a particular slot in the QEP 72 contains a request waiting to be processed. Once the twit entry is retired, the bit may be cleared and another request can be stored in the corresponding slot of the QEP 72.

An entry ready field may be stored in the QEP 72 to indicate whether a transaction is ready to be delivered to the MCON back end 44. Thus, once the entry ready bit is set by the MCON control block 46, the request is ready to be sent to the MCON back end 44 for processing. Further, if the READ queue depth checker 70 sends a signal to the queue entry pool 72 indicating that the combined depths of the READ sub-queues 62a–62c are above a set threshold, the entry ready bit waits for a read ready signal from the MCON control block 46 before the bit is set, although the rest of the entry is immediately stored in the queue entry pool 72.

The entry sent field is used to indicate that a particular entry has been received at a corresponding location. The entry sent bit is set when either the entry receives an acknowledgement signal from the MCON back end 44 or an implicit writeback request from the MCON control block 46. When an entry is created in the queue entry pool 72, the entry sent bit is cleared. If a re-read request is received from the MCON control block 46 corresponding to an implicit writeback for this particular entry, the entry sent field is cleared thereby allowing the entry to be re-sent to the MCON back end 44 for eventual transmission to the host controller 16.

The entry pending field is set when the MCON back end request is sampled as asserted or when the incoming entry is used as an automatic arbitration winner. The entry pending bit is cleared when the entry sent bit is set. By setting the entry pending bit, the priority encoder 74 (which will be discussed further below) ignores the entry and thus prioritizes other requests in the queue entry pool 72 ahead of the request with the entry pending bit set.

Generally speaking, the fields stored for each request in the QEP 72 may create a state machine providing a road map for the processing of the requests in the QEP 72. The specific fields and the sequence of execution dictated by these fields may be specific and unique for a particular system design. For this particular application, it is enough to know that various information delivered with each request and with corresponding control signals are stored in the queue entry pool 72 such that they may be interpreted and used by the other components of the READ sub-queue 62a to prioritize the processing of the requests in the queue entry pool 72.

Figure 6:
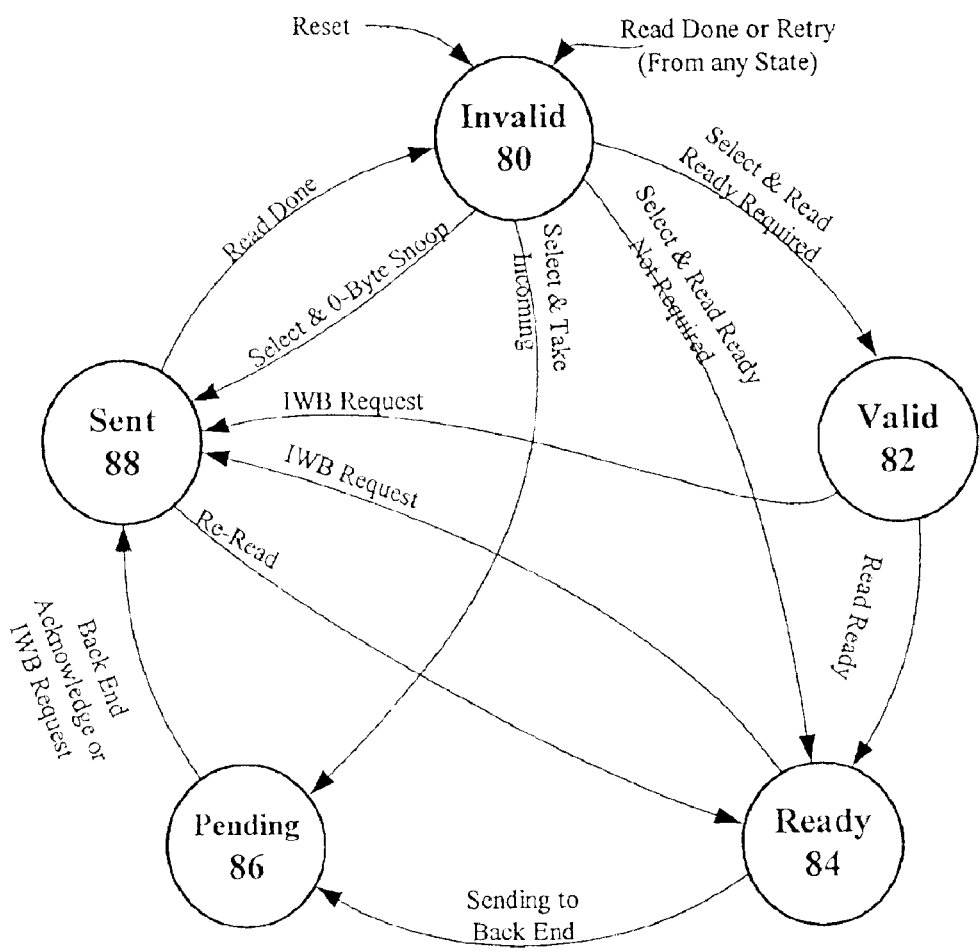
FIG. 6 is a state diagram illustrating exemplary states of the READ queue illustrated in FIG. 5.

An exemplary state diagram is illustrated in FIG. 6. The State Machine Flags in the QEP 72 can then also be considered to be a queue of state machines. Initially, a state value is in the "Invalid" state 80. If either a Read Done signal or a Retry signal arrives for the transaction, then the state value returns to this state no matter what state it had been in. The Read Queue Select signal asserts when a new transaction arrives. The state will transition from the Invalid state 80 to one of several other states depending on the state of other signals, as described below.

If the incoming transaction is a Zero Byte Snoop, then all data that should be sent has already been sent (i.e. none). As a result, the state value is set to the "Sent" state 88. These transactions are used by a CPU 12A–12H to force a second CPU 12A–12H to mark any cacheline containing data for the specified address as invalid. If that second CPU 12A–12H had previously modified the data associated with that address, then the CPU 12A–12H will execute an Explicit WriteBack (EWB) transaction to write the data back to memory. It is the address rather than the data that is important in the Zero Byte Snoop transactions.

If the incoming transaction is not a Zero Byte Snoop, but there are no entries in the queue that have not already been sent to the MCON back end 44, then this incoming transaction is automatically the priority winner. In this situation, arbitration may be bypassed and a Take Incoming signal is asserted by the priority encoder 74. In this case, the state value goes from the Invalid state 80 to the "Pending" state 86.

If the incoming transaction is not a Zero Byte Snoop or an automatic priority winner, and a Read Ready Required signal is not asserted, then the transaction need not wait any longer and is delivered to the MCON back end 44 at the next opportunity. The state value goes from the Invalid state 80 directly to the "Ready" state 84.

If the state value is in the Valid state 82, it waits in the Valid state 82 until the Read Ready signal is asserted for this transaction. When this signal is asserted, the state value transitions from the Valid state 82 to the Ready state 84. If, however, an IWB Request signal arrives for a transaction in this queue, then the transaction is moved from this queue to the IWB Queues 66. Since it has been moved, the queue no longer needs to send the request. The state value transitions to the Sent state immediately insteady of following the usual path discussed above. The IWB Request can be initiated from any of the IWB Sources.

Once the entry is in the Ready state 84, the priority encoder 74 (FIG. 5) is implemented. When the priority encoder 74 determines that the entry is to be sent to the MCON back end 44, a Back End Request signal is asserted by the priority encoder 74. The state value then transitions to the pending state 86. However, as described above with reference to the Valid state 82, an IWB Request will force the state value to the Sent state 88. back end Once the entry is in the Pending state 86, it will no longer be considered in the arbitration of the priority encoder 74. The arbitrator in the MCON back end 74 determines which entry to send next, but waits until the current entry exits the Pending state 86 before selecting the new winner. The state value remains in the Pending state 86 as long as the transaction is being sent to the MCON back end 44. Once the MCON back end 44 acknowledges receipt of the transaction, the state value transitions to the Sent state 88. However, as previously described, with reference to the valid state 82 above, an IWB Request will transition the entry to the Sent state 88 without waiting for an acknowledge signal. In this instance, the priority encoder 74 will also select the next priority winner without waiting for the acknowledge signal. In the present embodiment, this is the only case where a pending request need not wait for an acknowledge signal.

The state value will remain in the Sent state 88 until the above mentioned Read Done signal arrives. At that time, the state value returns to the Invalid state 80. If, however, a Read Ready Request signal arrives for this transaction, then the state value is sent back to the Ready state 84 to be sent once again. As previously discussed, the various states and flags, which cause the transition among the states, may vary depending on specific system designs. Accordingly, the state diagram discussed with reference to FIG. 6 is illustrated by way of example.

Returning to FIG. 5, the READ sub-queue 62a also includes an index shifter 76, a flag multiplexor 78, and a priority encoder 74. These components generally facilitate the ordered processing of the requests stored in the queue entry pool 72 in accordance with arbitration rules, such as those dictated by the entry flags and the state diagram illustrated in FIG. 6. The flag multiplexor 78 arbitrates among entries as further described below with reference to FIG. 7. As entries are written into the QEP 72, the index for each entry is written into the index shifter 76. The index shifter 76 uses the valid entry bits of each corresponding entry to track the progress through the index shifter 76. Generally speaking, the index shifter 76 includes a plurality of registers (illustrated in FIG. 7), each register corresponding to an entry slot in the QEP 72. As a request is stored in the QEP 72, the index referencing that request is injected into the "head" end of the index shifter 76. As new indices are injected into the head of the index shifter 76 due to new requests being stored in the QEP 72, the indices are pushed to the next register in the index shifter. Thus, the oldest index (corresponding to the oldest request in the QEP 72) is always closer to the "tail" of the index shifter than any new indices. As requests are retired or invalidated out of order, vacated registers are filled as the indices closer to the tail of the index shifter 76 collapse forward to fill the gap. The index shifter 76 and corresponding registers will be further described with reference to FIG. 7.

The registers in the index shifter 76 include a multiplexor which can either hold current data or capture data from the previous register, or force the register to point to an invalid entry in the QEP 72. A register will capture data from the previous register if the valid entry flag is cleared for the current entry or if the entry following the current entry register is also capturing data from its previous register (i.e., the current register). This collapses the lowest (closest to the tail) invalid slot and simultaneously creates an available slot at the head by pointing the head slot to an invalid QEP entry. Similarly, if an entry is being retired, as it becomes invalid it will collapse if possible. Since the multiplexor in the index shifter 76 only points to its nearest upstream neighbor, only one available slot can be moved to the head on any clock cycle. The shifting operation guarantees that if an entry anywhere in the index shifter 76 points to an invalid QEP slot, then each index shifter slot between the available one and the head move immediately toward the tail. This leaves an available slot at the head to receive a new entry regardless of where the available slot was before the move. If more than one slot is available at any time, then each of the index shifter slots between the available one and the head immediately move toward the tail, including any other slots which may also be available. This leaves an available slot at the head to receive a new entry regardless of where the collapsed available slot was before the move. The other available slot will then be collapsed in turn, once per clock, beginning with the next closest available slot to the tail. A register will be forced to point to an invalid entry when the data it contains is being retired and it is not shifting, or when the previous register's entry is being retired and is shifting. This process keeps a re-used transaction identification from aliasing as the older transaction which had been retired but had not yet shifted fully out of the shifter.

The priority encoder 74 determines which READ request stored in the QEP 72 to send to the MCON back end 44 by checking the flag states of the QEP 72 sorted in the order specified by the indicies in the index shifter 76. The flag MUX 78 is used to perform the sorting. The selected index number is returned to the QEP 72 which multiplexes that entry onto the bus to send the entry to the MCON back end 44. If any such entry is chosen, the priority encoder 74 also sends a corresponding request signal to the MCON back end 44. Had an incoming transaction won immediate access to the MCON back end 44 via the bypass block 60, the priority encoder 74 will take a "hand-off" to maintain the request to the MCON back end 44 until the normal path through the READ queue 62 is established.back end The send ready bus from the flag MUX 78 is used to determine when an entry is ready to be sent. The oldest entry which is ready to be sent has the highest priority. As previously described, the oldest entry ready to be sent is determined by its position in the index shifter 76. The index closest to the head of the index shifter 76 and with a send ready flag set is selected as the outgoing entries index. Once the values of the index of the QEP entry and the READ request are determined, they are locked into a register until the cycle completes. The cycle completes when the MCON back end 44 sends an acknowledge signal to the READ sub-queue 62a, or if the QEP signals associated with the current entry are no longer valid. The MCON back end 44 sends an acknowledge signal in reference to the information it sampled on the previous clock. Thus the request and index delayed one clock cycle with reference to the acknowledge signal to ensure they all refer to the same clock cycle. When the current entry being sent to the MCON back end 44 is an implicit writeback, a new arbitration occurs to get the next oldest entry that is ready to be sent. This arbitration occurs without waiting for an acknowledgement signal from the MCON back end 44. As previously stated, this is the only case where a pending request need not wait for an acknowledgement signal from the MCON back end 44.

Figure 7:
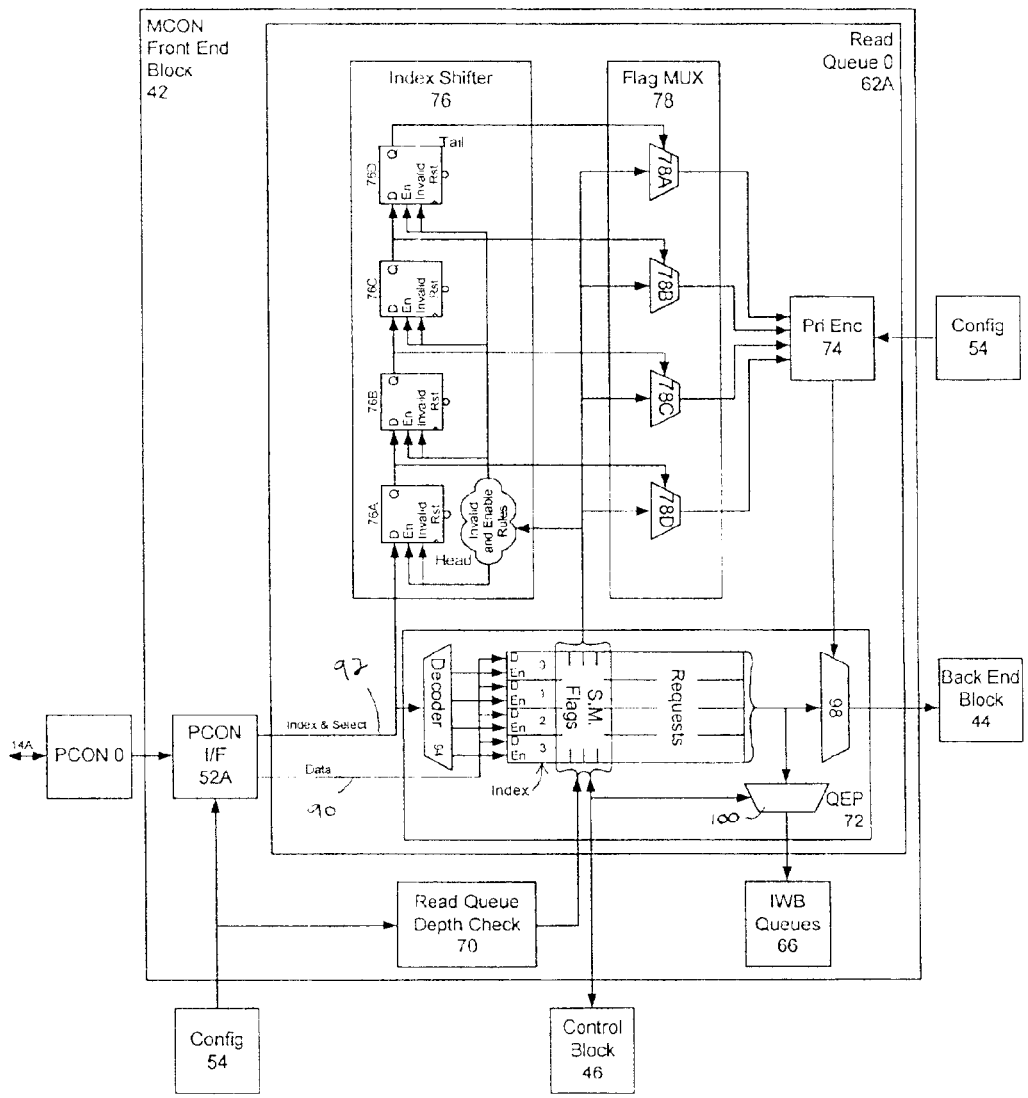
FIG. 7 illustrates a schematic drawing of the exemplary READ queue illustrated in FIG. 5.

FIG. 7 illustrates an expanded block diagram of the READ sub-queue 62a illustrated in FIG. 5. The specific configurations are illustrated by way of example. As can be appreciated by those skilled in the art, various configurations incorporating the techniques described herein may be implemented. As previously described, the PCON0 interface 52A delivers data to the queue entry pool 72 via a data path illustrated generally by reference numeral 90. The corresponding flags and indices are delivered to the queue entry pool 72 via path 92 and through the decoder 94. Information which is sent with each request is translated by the decoder 94 and stored at one of the entry locations in the QEP 72. In the present example, the QEP 72 includes four registers or slots in which requests may be stored as indicated by the index numbers 0–3. Further, other bit locations in the queue entry pool 72 may be reserved for state machine, as previously described. For instance, bit 0 may be reserved for the valid entry bit. If a logical zero is stored in the valid entry bit, the slot in the queue entry pool 72 is available for request storage at the corresponding slot. If a logical one is stored in the valid entry bit, the entry slot contains a request which must be processed before the slot can be used to store another request.

Other QEP 72 bits may be reserved for other flags such as the entry ready flag which may be stored in QEP bit 1, the entry sent flag which may be stored in QEP bit 2, and the entry pending flag which may be stored in QEP bit 3, for example. As previously described, the settings of each of these bits which corresponds to a particular request provide the priority encoder 74 with the necessary information to process the request from the QEP 72 in a desirable order. This particular scheme provides for out-of-order processing of requests. That is to say, rather than processing the requests in the order in which they are received, the state diagram described with reference to FIG. 6 dictates the processing order.

When an entry is stored in the QEP 72, the entry index corresponding to the storage location in the QEP 72 is also delivered to the index shifter 76 via path 92. The index shifter 76 includes as many registers as there are entry slots in the queue entry pool 72. In the present example, there are four entry slots 0–3. Each entry slot has a corresponding register 76A–76D in the index shifter 76. Because the requests in the QEP 72 remain in the slot in which they were placed until the request is retired, it is the corresponding index which is stored in the index shifter 76 in a particular register 76A–76D which shifts and dictates the order of request processing. The index stored in the index shifter 76 retains information corresponding to the particular slot in which a request is stored in the queue entry pool 72. Thus, if the request corresponding to the index stored in the register 76C is processed, each of the indices stored in registers 76B and 76A will shift up one register in the index shifter 76 on a respective clock cycle. Advantageously, since the registers 76A–76D in the index shifter 76 only retain location information (i.e., the index of a given request) the registers need only be configured to provide enough storage for a corresponding index. In the present example, where the queue entry pool 72 only comprises four entry slots, each register 76A–76D only needs to include enough storage space for two bits to store each binary index 00, 01, 10, or 11. For a QEP 72 with 16 entry slots, for example, 16 four-bit registers 76A–76D may be implemented. As previously discussed, the selection of the request by the priority encoder 74 is dictated by the state of the flags for each request, as dictated by the invalid and enable rules illustrated in the state diagram in FIG. 6.

The flag multiplexor 78 may include a plurality of multiplexors 78A–78D, each corresponding to an entry slot in the QEP 72. Each multiplexor 78A–78D receives a corresponding input signal from the QEP 72 and the index shifter 76. Each flag multiplexor 78A–78D produces an output to the priority encoder 74. Based on the flag settings of each request and the position of the corresponding index in the index shifter 76, the request is finally delivered to the MCON back end 44 through a multiplexor 98. Alternatively, the request may be reassigned to the IWB queues 66, as described above. The request may be delivered to the IWB queues 66 through the multiplexor 100.

By using the index shifter 76 and the configuration described with reference to FIGS. 4–7 out-of-order retirement of requests is possible. Because the system 10 actually includes three different processor controllers PCON0–2 corresponding to a respective bus 14A, 14B, and 27, it is possible that the PCON interface 52A–52C could receive multiple inputs simultaneously. It may be desirable to provide a unified queue to track inputs from each of the processor controllers PCON0–2, rather than providing individual queues for each processor controller PCON0–2. To allow for this possibility, extra stages or registers may be added to the index shifter 76. Extra stages may be added to the tail of the index shifter 76 such that the number of registers is increased for every source beyond the first. Thus, a cross bar switch and two extra registers may be added to the present configuration having three sources (bus 14A, 14B and 27) to allow for the pipelining of the multiple inputs. In this case however since an index can only be shifted one register location at a time, the processor controllers PCON0–2 should only initiate the requests once every three clock cycles to ensure that all requests can be indexed.

An alternate configuration of the present READ sub-queue implements a similar technique. However, instead of storing and shifting the index for a particular request to allow for out-of-order processing, the queue entries themselves may be stored in a shift register. In this case, the entries can still be retired out-of-order. Other than retiring the oldest entry and shifting the rest down in the shift register, the shift register may retire entries in the middle as they become invalid and shift each of the entries above the oldest invalid entry. This does not effect the valid entries below the invalid entry. The oldest entries in the shift register then have the highest priority regardless of the out-of-order execution. Disadvantageously, however each register in the shift register must include additional storage capacity since the entire entry is stored and shifted. Further, the content of the queue may be modified while the corresponding entry is in the queues. Without fixing the position of the data, tracking the location of the data may be difficult if modification of the data is necessary.

Still another alternative embodiment involves implementing a masking structure in the place of the index shifter 76 and flag MUX 78. A queue, such as the read sub-queue 62A may be implemented as a circular first-in, first-out (FIFO) queue. A mask which is twice as wide as the FIFO may be constructed to properly prioritize out of order entries in the queue 62A. The mask value is determined by the position of the current output pointer. For an output pointer point to an entry number N, the first half of the mask contains N "0" bits. Each of the remaining bits are filled with a logical "1." The second half of the mask contains N "1" bits with each of the remaining bits filled with "0." Thus, the second half of the mask entry "wraps" to the same entry as the first half. As the output pointer progresses, previously processed entries are pushed to the lowest priority in favor of the closest upcoming entries.

Regardless of whether the index shifter, entry shifter, or mask is incorporated, the present embodiments handle a complex queuing structure which requires out-of-order operation and multiple entries loading in a single clock period. Proper priority level is maintained for all outstanding cycles such that the oldest entry will be processed first when it is ready. Advantageously, these techniques reduce stalls which would normally be associated with systems which do not permit out-of-order processing of requests. The present system is thereby more efficient than prior systems.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A queue structure comprising:
   a queue entry pool comprising a plurality of fixed registers configured to store requests wherein each request has a corresponding index; and
   an index shifter coupled to the queue entry pool and comprising a plurality of shift registers, wherein each shift register corresponds to one of the plurality of fixed registers and wherein each of the shift registers is configured to store only an index corresponding to a request stored in one of the plurality of fixed registers.

2. The queue structure, as set forth in claim 1, wherein the queue entry pool is configured to store read requests.

3. The queue structure, as set forth in claim 1, wherein each of the plurality of fixed registers is configured to store a plurality of flags corresponding to the status or each request.

4. The queue structure, as set forth in claim 3, wherein each of the plurality of fixed registers is configured to store each of a valid entry flag, an entry ready flag and a retire entry flag for the corresponding request.

5. The queue structure, as set forth in claim 4, comprising a flag multiplexor coupled to each of the queue entry pool and the index shifter and configured to receive a plurality of input signals, each of the plurality of input signals corresponding to one of the valid entry flag, the entry ready flag and the retire entry flag and further configured to produce a plurality of output signals each of the plurality of output signals corresponding to one of the valid entry flag, the entry read flag and the retire entry flag.

6. The queue structure, as set forth in claim 5, comprising a priority encoder coupled to each of the flag multiplexor and the queue entry pool and configured to receive each of the plurality of output signals and configured to select one of the requests for execution based on the plurality of output signals.

7. The queue structure, as set forth in claim 1, comprising a queue structure depth checker coupled to the queue entry pool and configured to track the number of requests stored in the queue.

8. A memory controller comprising:
   a plurality of processor controller interfaces, wherein each of the plurality of processor controller interfaces is configured to receive requests from one of a processor bus and an input/output bus, each request having a corresponding request type; and
   a plurality of queues coupled to each of the processor controller interfaces and configured to store the requests, wherein each request is delivered to one of the plurality of queues depending on the origin of the request and the request type, and wherein each of the plurality of queues comprises:
      a queue entry pool comprising a plurality of fixed registers configured to store requests wherein each request has a corresponding index; and
      an index shifter coupled to the queue entry pool and comprising a plurality of shift registers, wherein each shift register corresponds to one of the plurality of fixed registers and wherein each of the shift registers is configured to store only an index corresponding to a request stored in one of the plurality of fixed registers.

9. The memory controller, as set forth in claim 8, wherein the plurality of queues comprises a plurality of read queues configured to store read requests.

10. The memory controller, as set forth in claim 8, wherein the plurality of queues comprises a plurality of write queues configured to store write requests.

11. The memory controller, as set forth in claim 8, wherein the plurality of queues comprises a plurality of IRV queues configured to store requests associated with a hot-plug event.

12. The memory controller, as set forth in claim 11, wherein the plurality of IRV queues are configured to store each of initialization requests, rebuild requests and verify requests, wherein each of the requests are generated in response to a hot-plug event.

13. The memory controller, as set forth in claim 8, wherein each of the plurality of fixed registers is configured to store a plurality of flags corresponding to the status of each request.

14. The memory controller, as set forth in claim 13, wherein each of the plurality of fixed registers is configured to store each of the valid entry flag, an entry ready flag and a retire entry flag for the corresponding request.

15. The memory controller, as set forth in claim 14, comprising a flag multiplexor coupled to each of the queue entry pool and the index shifter configured to receive a plurality of input signals, each of the plurality of input signals corresponding to one of the valid entry flag, the entry ready flag and the retire entry flag and further configured to produce a plurality of output signals each of the plurality of output signals corresponding to one of the valid entry flag, the entry read flag and the retire entry flag.

16. The memory controller, as set forth in claim 15, comprising a priority encoder coupled to each of the flag multiplexor and the queue entry pool and configured to receive each of the plurality of output signals and configured to select one of the requests for execution based on the plurality of output signals.

17. The memory controller, as set forth in claim 8, comprising a bypass block coupled to each of the plurality of processor controller interfaces and configured to facilitate the execution of the requests received by the plurality of processor controller interfaces without storing the requests in one of the plurality of queues.

18. The memory controller, as set forth in claim 8, comprising a control block coupled to each of the plurality of queues and configured to provide control signal to facilitate the storing and execution of the requests in the plurality of queues.

19. The memory controller, as set forth in claim 18, comprising a control interface block coupled to the control block and further coupled to each of the plurality of processor controller interfaces, wherein the control interface block is configured to transfer the requests from the plurality of processor controller interfaces to the control block.

20. A system comprising:
   one or more processors; and
   a memory controller coupled to the one or more processors and comprising:
      a plurality of processor controller interfaces, wherein each of the plurality of processor controller interfaces is configured to receive requests from one of a processor bus and an input/output bus, each request having a corresponding request type; and
      a plurality of queues coupled to each of the processor controller interfaces and configured to store the requests, wherein each request is delivered to one of the plurality of queues depending on the origin of the request and the request type, and wherein each of the plurality of queues comprises:
         a queue entry pool comprising a plurality of fixed registers configured to store requests wherein each request has a corresponding index; and an index shifter coupled to the queue entry pool and comprising a plurality of shift registers, wherein each shift register corresponds to one of the plurality of fixed registers and wherein each of the shift registers is configured to store only an index corresponding to a request stored in one of the plurality of fixed registers.

21. The system, as set forth in claim 20, wherein the plurality of queues comprises a plurality of read queues configured to store read requests.

22. The system, as set forth in claim 20, wherein the plurality of queues comprises a plurality of write queues configured to store write requests.

23. The system, as set forth in claim 20, wherein the plurality of queues comprises a plurality of IRV queues configured to store requests associated with a hot-plug event.

24. The system, as set forth in claim 23, wherein the plurality of IRV queues are configured to store each of initialization requests, rebuild requests and verify requests, wherein each of the requests are generated in response to a hot-plug event.

25. The system, as set forth in claim 20, wherein each of the plurality of fixed registers is configured to store a plurality of flags corresponding to the status of each request.

26. The system, as set forth in claim 25, wherein each of the plurality of fixed registers is configured to store each of the valid entry flag, an entry ready flag and a retire entry flag for the corresponding request.

27. The system, as set forth in claim 26, comprising a flag multiplexor coupled to each of the queue entry pool and the index shifter configured to receive a plurality of input signals, each of the plurality of input signals corresponding to one of the valid entry flag, the entry ready flag and the retire entry flag and further configured to produce a plurality of output signals each of the plurality of output signals corresponding to one of the valid entry flag, the entry read flag and the retire entry flag.

28. The system, as set forth in claim 27, comprising a priority encoder coupled to each of the flag multiplexor and the queue entry pool and configured to receive each of the plurality of output signals and configured to select one of the requests for execution based on the plurality of output signals.

29. The system, as set forth in claim 20, comprising a bypass block coupled to each of the plurality of processor controller interfaces and configured to facilitate the execution of the requests received by the plurality of processor controller interfaces without storing the requests in one of the plurality of queues.

30. The system, as set forth in claim 20, comprising a control block coupled to each of the plurality of queues and configured to provide control signals to facilitate the storing and execution of the requests in the plurality of queues.

31. The system, as set forth in claim 30, comprising a control interface block coupled to the control block and further coupled to each of the plurality of processor controller interfaces, wherein the control interface block is configured to transfer the requests from the plurality of processor controller interfaces to the control block.

32. The system, as set forth in claim 20, wherein the system comprises a computer system.

33. The system, as set forth in claim 20, wherein the system comprises a network of computers.

34. A method of processing requests comprising the acts of:

storing requests in respective fixed registers, each request having a corresponding index;

storing only the index corresponding to each of the requests in a respective shift register; and processing the requests in an order determined by the location of each index in the shift register.

35. The method of processing requests, as set forth in claim 34, comprising the act of storing a plurality of flags associated with each request in the respective fixed register, wherein each of the plurality of flags has a corresponding state.

36. The method of processing requests, as set forth in claim 35, comprising the act of reading the corresponding state of each flag to determine a processing order of the requests.

37. The method of processing requests comprising the acts of:

storing a first request in a fixed register, the first request comprising a first index and a first plurality of flags;

storing a second request in the fixed register, the second request comprising a second index and a second plurality of flags;

storing only the first index in a first shift register in an entry shifter, wherein the entry shifter comprises a head and a tail;

storing only the second index in a second shift register in the entry shifter, wherein the second shift register is closer to the head of the entry shifter than the first shift register;

checking the first plurality of flags to determine whether the first request is ready to be executed;

executing the first request if the first request is ready to be executed;

shifting the second index into the first shift register, if the first request is executed;

checking the second plurality of flags to determine whether the second request is ready to be executed; and executing the second request if the second request is ready to be executed.

38. The method of processing requests, as set forth in claim 37, wherein the act of storing a first request comprises the act of storing a first read request in a fixed register.

39. The method of processing requests, as set forth in claim 38, wherein the act of storing a second request comprises the act of storing a second read request in a fixed register.

40. A queue structure comprising:

a queue entry pool comprising a plurality of fixed registers configured to store requests, wherein each of the plurality of fixed registers is configured to store a plurality of flags corresponding to the status of each request; and an entry shifter coupled to the queue entry pool and comprising a plurality of shift registers, each of the shift registers is configured to store a request corresponding to a request stored in one of the plurality of fixed registers.

41. The queue structure, as set forth in claim 40, wherein the queue entry pool is configured to store read requests.

42. The queue structure, as set forth in claim 41, wherein each of the plurality of fixed registers is configured to store each of a valid entry flag, an entry ready flag and a retire entry flag for the corresponding request.

43. The queue structure, as set forth in claim 42, comprising a flag multiplexor coupled to each of the queue entry pool and the entry shifter and configured to receive a plurality of input signals, each of the plurality of input signals corresponding to one of the valid entry flag, the entry ready flag and the retire entry flag and further configured to produce a plurality of output signals each of the plurality of output signals corresponding to one of the valid entry flag, the entry ready flag and the retire entry flag.

44. The queue structure, as set forth in claim 43 comprising a priority encoder coupled to each of the flag multiplexor and the queue entry pool and configured to receive each of the plurality of output signals and configured to select one of the requests for execution based on the plurality of output signals.

45. The queue structure, as set forth in claim 40, comprising a queue structure depth checker coupled to the queue entry pool and configured to track the number of requests stored in the queue.

* * * * *